Dec. 8, 1959  J. O'BROCHTA  2,916,494
PURIFICATION OF 3-PYRIDINE CARBOXYLIC ACID
Filed May 15, 1958
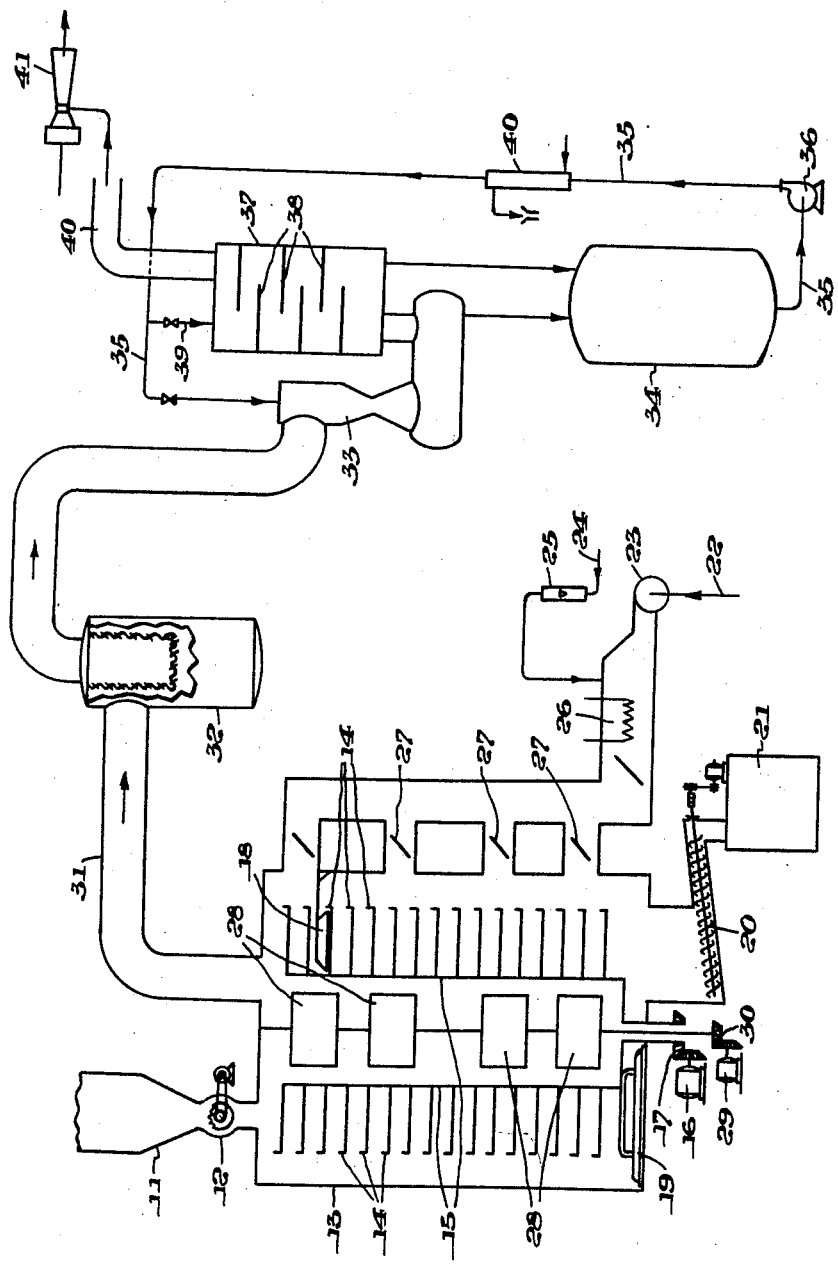
INVENTOR.
JOHN O'BROCHTA.
BY J.E. Armstrong
his ATTORNEY.

United States Patent Office 2,916,494
Patented Dec. 8, 1959

2,916,494

PURIFICATION OF 3-PYRIDINE CARBOXYLIC ACID

John O'Brochta, Pittsburgh, Pa., assignor to Koppers Company, Inc., a corporation of Delaware Application May 15, 1958, Serial No. 735,551

3 Claims. (Cl. 260—295.5)

This invention relates to the purification of 3-pyridine carboxylic acid, i.e. nicotinic acid. In one specific aspect, it relates to a method of separating non-volatile impurities from nicotinic acid by a sublimation technique to produce a substantially pure product.

Nicotinic acid (niacin) is a member of the vitamin B complex group and is extremely useful in the enrichment of foods to improve their nutritional values. The extensive use of nicotinic acid as a food supplement has given considerable impetus to the quest for refining techniques which provide a high yield of substantially pure product. To meet U.S.P. grade specifications for nicotinic acid, it is necessary to reduce heavy metal contamination to a level of less than 20 parts per million. In addition, the nicotinic acid must contain less than 200 parts per million sulfates, less than 200 parts per million chlorides, and less than 0.1% residue on ignition. The nicotinic acid must have no odor or foreign color.

The art of making nicotinic acid is well established. For instance, one process comprises mixing sulfuric acid and quinoline, and reacting the quinoline sulfate thus formed with nitric acid at elevated temperatures to produce nicotinic acid. Nicotinic acid is also made by oxidizing quinoline with sulfuric acid in the presence of a relatively small amount of a selenium compound at temperatures between 295 and 315° C. Still another method comprises oxidation of quinoline in the presence of sulfuric acid and nitrosyl chloride. Crude nicotinic acid, made by these or any other of the known processes, contains varying amounts, generally from 3–30%, of mixtures of such salts as sodium chloride, sodium sulfate, sodium nitrate, calcium sulfate, sodium nicotinate, copper nicotinate, calcium nicotinate, nicotinic acid hydrochloride, nicotinic sulfate, nicotinic nitrate, iron sulfate, iron chloride, and copper sulfate. In addition, the crude material contains non-volatile organic impurities which impart color to the product.

Classically, crude nicotinic acid is refined by precipitating nicotinic acid from the crude mass as the insoluble copper nicotinate. Using this technique, multiple recycling operations of the mother liquor and the recoverable copper oxide are required, and it is difficult to separate the gelatinous copper oxide from the final product. Other known processes involve conversion of the crude nicotinic acid to sodium nicotinate and subsequent neutralization and extraction or recrystallization, direct neutralization and subsequent extraction of the nicotinic acid, precipitation of the nicotinic acid as the nitrate or sulfate followed by neutralization and extraction or recrystallization from water or an alcohol. The complete removal of impurities, especially the inorganic salts, by these known methods has necessitated the handling of large volumes of material, or alternatively, the use of multiple recrystallization or recycling operations. Thus, using known methods, it has been difficult to make U.S.P. grade nicotinic acid without entailing considerable expense in equipment costs or cumbersome processing operations.

I have discovered a novel method of separating nicotinic acid in substantially pure form by a combined vaporization and condensation technique. My method is applicable to crude nicotinic acid made by any process.

It is, therefore, an object of the present invention to provide a novel and economical method for refining crude nicotinic acid and to make a substantially pure product eminently suitable as a food supplement and for other uses wherein high purity is essential.

In accordance with the present invention, crude, impure nicotinic acid is heated to a temperature of 160–250° C. to vaporize the nicotinic acid, and substantially pure nicotinic acid is recovered by condensing the vaporized acid. The impurities present in the crude acid (hereinbefore described) are substantially all non-volatile, and are left behind in the crude mass. The vaporized material obtained upon heating is substantially pure nicotinic acid. My method is readily adaptable to continuous operation.

It is necessary, for purposes of the invention, to maintain the temperature of the crude nicotinic acid at 160–250° C. Below 160° C. insufficient sublimation takes place and the separation of the pure nicotinic acid is unduly prolonged. Above 250° C. the nicotinic acid decomposes rapidly and hence, at such temperatures, considerable loss of product occurs. I prefer to use temperatures of 210–225° C.

The separation of nicotinic acid from the crude mass is conducted preferably at substantially atmospheric pressures. A slight vacuum, e.g. a reduced pressure of 0.1 to 3 inches of water, is helpful in rapidly separating the pure nicotinic acid vapors from the crude product. Alternatively, the nicotinic acid can be heated to the required temperature under a reduced pressure of 10–100 mm. of mercury. While such a process can be effectively operated, the equipment cost involved makes it less attractive commercially. Thus, any pressure ranging from a reduced pressure of 10 mm. of mercury to atmospheric pressure is suitable for my novel refining method.

Heating of the crude nicotinic acid is effected in a substantially inert atmosphere. An atmosphere comprising air, steam, mixtures of steam and air, or nitrogen is quite suitable. The inert atmosphere acts as an entrainer, or carrier, for the nicotinic acid vapors. Thus, during sublimation, the acid vapors are entrained in the inert atmosphere and thereafter carried away and condensed as pure, crystalline nicotinic acid.

In a preferred embodiment of the present invention, a mixture of steam and air is used as the entrainer. Superheated steam, e.g. steam delivered from a high pressure steam line at a temperature of about 175–180° C. under a pressure of about 150 p.s.i.g. and introduced into the system at atmospheric pressure, is preferable to saturated steam, since there is less chance of the heat losses of the system causing condensation of sublimed nicotinic acid and moisture, which results in a plugging of the equipment. While it is possible to use up to 100% steam or 100% air, it is preferred to use 0.5–2 pounds of air per pound of steam. When 100% steam is used as the entrainer, provision must be made in the condensation step for the relatively large amount of water added to the system. There is also a possibility of localized condensation of moisture within the system which would result in caking of the crude nicotinic acid. The use of some steam is desirable since it reduces any fire or explosion hazard which may exist because of nicotinic acid dust or vapors present in the system. Furthermore, it is sometimes difficult, using 100% air, to condense the nicotinic acid vapors.

For continuous operation, it is preferable to supply heat to the system by pre-heating the entrainer to a temperature of about 250–350° C. and passing it over the nicotinic acid in an insulated reactor, rather than by supplying heat to the reactor. If heat is supplied directly to the reactor, there is some danger of local overheating, which would result in partial decomposition of the nicotinic acid and, hence, a reduced yield of pure product. However, a carefully controlled heating of the reactor avoids this danger, as indicated in the examples, infra.

Thus, in an embodiment of my invention, the preheated mixture of steam and air serves the two-fold purpose of (1) supplying the energy required to heat the solid feed to the temperature necessary to vaporize the water and nicotinic aid contained in the crude feed, and (2) acting as an entrainer to sweep the vapors of nicotinic acid from the reactor in which sublimation takes place to the condensing system. I have already indicated that the use of super-heated steam effectively compensates for heat losses which may occur throughout the system.

For the continuous method of my invention, the entrainer to feed ratio is maintained between about 1 pound mol of entrainer for each 0.005–0.02 pound mols of feed. If the ratio of entrainer to feed is too high, considerable dusting occurs in the reactor. If the ratio is too low, considerable difficulty is experienced in removing the pure nicotinic acid vapors from the crude material and too great an amount of crude feed is built up in the reactor.

I have indicated that a slight vacuum may be applied to the system to facilitate passage of a steady stream of entrainer over the crude feed. I have found that a vacuum of 0.1–3 inches of water is quite suitable. The driving forces resulting from feeding steam from a high pressure line and air from a blower also serve to move the entrainer through the system.

Pure nicotinic acid may be recovered from the nicotinic acid vapors which have been separated from the crude feed by a number of methods. One effective technique involves passing the vaporized nicotinic acid through an electrostatic precipitator and recovering the pure, crystalline nicotinic acid therefrom. From the standpoint of cost, I have found that the preferred method of product recovery is to contact the nicotinic acid vapors with water and condense the nicotinic acid therein. A water bath, or alternatively a water spray and collecting tank, serves the dual function of cooling the hot nicotinic acid vapors and providing a medium in which the pure nicotinic acid crystals can form and grow. Nicotinic acid is soluble in water to the extent of about 10% by weight (based on the weight of the water) at 100° C. As the temperature of the water is lowered to 25–50° C. (or lower if desired) nicotinic acid crystals begin to form therein. Substantially pure nicotinic acid is removed from the water by filtration. The product from the filter is dried, preferably under vacuum, at a temperature of 50–120° C. The lower temperature limit is practical, rather than theoretical. The upper limit is chosen to avoid loss of product by sublimation.

To remove the last traces of color from the product, it is sometimes necessary to treat it with activated charcoal. This can be conveniently accomplished by suspending and agitating nicotinic acid crystals in an aqueous bath containing from 0.5–2% by weight of the charcoal (based upon the weight of nicotinic acid). Alternatively, the indicated weight of charcoal can be added directly to the slurry of crystals from the condensing step. The slurry is heated to dissolve the nicotinic acid and the resulting solution containing the charcoal is agitated for ¼ to 2 hours. The hot solution is filtered to remove the charcoal and the filtrate is thereafter cooled to crystallize the nicotinic acid. Subsequent filtration and drying under the conditions indicated above yields a clean, white product representing nicotinic acid meeting U.S.P. specifications.

Referring now to the drawing, the figure represents a schematic equipment flow sheet of a commercial embodiment of my invention.

In the figure, solid crude nicotinic acid containing about 70–97% by weight nicotinic acid and 3–30% by weight water and organic and inorganic salts is charged to feed hopper 11 from the previous step of the manufacturing process. The material is fed by means of a partially corrugated rotating feeder 12 into the sublimer (reactor) 13 where it falls into the top trap of a series of vertically stacked trays 14. The trays 14 are circular with large holes in the centers. They are supported by several vertical bars 15 to produce an assembly which can be rotated as a unit about a central vertical axis by means of the tray rotating motor 16 and driving assembly 17. Each tray contains several slot-like holes or openings through which the solid material is forced to fall to the tray below by virtue of the scrapping action of the stationary scrapping blades 18 (shown in part). One scrapping blade is provided for each tray. The flow of solid from the top tray to the bottom tray is thus assured. As the feed progresses from the top to the bottom of the reactor, nicotinic acid is continuously vaporized therefrom. The portion of the feed which reaches the bottom of the sublimer, comprising substantially non-volatile materials, is scraped by wiper blade 19, attached to the rotating tray assembly, into the inlet of screw conveyor 20. The screw conveyor discharges the solid residue consisting essentially of non-volatile impurities and some unsublimed nicotinic acid into residue tank 21. The residue in tank 21 can be either discarded, or recycled to the process if it is desirable to recover the unsublimed nicotinic acid.

Air enters the system from line 22 through inlet blower 23. It is mixed with steam entering from line 24 through flow meter 25, and the mixture is heated to a temperature of 250–350° C. by electrical heater 26. Flow of the entrainer is controlled by means of dampers 27, and distributed so that the temperature within the sublimer 13 is uniform. Circulation of steam and air within sublimer 13 is assured by means of turbo fans 28 rotating on a vertical axis on a common staff driven by motor 29 and drive assembly 30.

Gases leaving the sublimer, consisting of air, superheated steam, and nicotinic acid, pass in conduit 31 through filter 32 to Venturi 33. At this point, they are contacted with a stream of water and nicotinic acid solution which is recirculated from surge tank 34 through line 35 by means of pump 36. When the hot gases are contacted with the aqueous nicotinic acid solution, they are cooled to about 80° C. and most of the condensed nicotinic acid is scrubbed therefrom. Remaining particles of nicotinic acid together with some mist from Venturi 33 are removed in demister-scrubber 37 by the combined action of baffles 38 and aqueous nicotinic acid solution delivered from the surge tank by pump 36 through lines 35 and 39. Heat is removed from the system by indirect contact of the solution from tank 34 with cooling water in heat exchanger 40. Nicotinic acid-free gas, consisting of moisture-laden air, is discharged from scrubber 37 through conduit 40. Circulation of the entrainer throughout the system is facilitated by steam jet evacuating means 41. Most of the crystallization of the nicotinic acid takes place in surge tank 34. The product is conveniently removed from the system by providing two tanks such as tank 34 which operate alternately on a batch cycle. Nicotinic acid crystals are recovered by filtering the aqueous slurry obtained from surge tank 34 on a filter (not shown), and thereafter dried in an oven (not shown).

My invention is further illustrated by the following examples.

EXAMPLE I

An apparatus is constructed similar to that shown in the figure of the drawing. Crude nicotinic acid, comprising 80% nicotinic acid, 10% water, and 10% non-volatile impurities, predominantly sodium sulfate, was fed to the reactor at a rate varying between 80 and 100 pounds per hour. A steam-air mixture comprising 1.6 pounds of air per pound of steam was circulated through the system at a feed rate of 1500 pounds per hour. The steam-air entrainer was pre-heated to a temperature of 340° C. to control the temperature within the sublimer at 210–220° C. The residence time of the non-volatile solids as they passed from the top to the bottom of the sublimer ranged from 10 to 13 hours. A 85–90% yield, based upon the amount of nicotinic acid in the crude feed, was obtained. Color was removed from the product by adding 1% by weight, based on the weight of the nicotinic acid, of Nuchar, a commercially available activated charcoal, to the aqueous slurry obtained from the condensing tank. The slurry, containing charcoal and nicotinic acid crystals was heated to solution, agitated for ½ hour and filtered to remove carbon. The solution was cooled to 35–40° C. to recrystallize the nicotinic acid and thereafter filtered. The pure nicotinic acid crystals thus obtained were dried under vacuum at 80° C. A typical analysis of the resulting product comprised:

Assay, percent nicotinic acid _____ 99.86.
Residue on ignition, percent _____ 0.01.
Melting point ranges _____ 234–235.7° C.
Chlorides _____ U.S.P. specifications.
Sulfates _____ U.S.P. specifications.
Heavy metals, p.p.m. _____ 0–5.

EXAMPLE II

An apparatus was constructed consisting of two flasks connected by a long arm. One of the flasks, the sublimer, was immersed in an oil bath and the other, the condenser, was cooled by a water bath. A vacuum pump was connected to the system through the receiver.

A 10 g. quantity of nicotinic acid was charged to the sublimer. The temperature of the oil bath was raised to 210° C., and a reduced pressure of 25 mm. of Hg was maintained on the system. After 15 minutes, a 75% yield of substantially pure nicotinic acid was recovered in the condenser.

EXAMPLE III

An apparatus was constructed consisting of two flasks connected by a long arm. One of the flasks, the sublimer, was positioned in a large oven and the other, the receiver, was equipped with a reflux condenser. A 9.7 g. quantity of crude nicotinic acid, containing 90% nicotinic acid, was charged to the sublimer. The temperature of the oven was maintained at 200–210° C. Steam was used as an entrainer. A 48.5 g. quantity of steam was passed over the surface of the nicotinic acid during the run. An 88% yield of colorless and ash-free nicotinic acid was recovered in the receiver.

EXAMPLE IV

An apparatus comprising a furnace and a condenser was constructed as follows:

A glass tube, 450 mm. in length with an inside diameter of 20 mm. comprised the furnace. One end thereof terminated in a ball socket joint; the other had inlets for entrainer and thermocouple. The furnace was packed with Berl saddles (ceramic packing) for half its length to facilitate heat transfer to the entrainer. Nichrome (nickel-chromium) resistance wire was wound around the outside to provide heat. The condenser was a glass tube 850 mm. in length and having a 20 mm. inside diameter. It extended horizontally for 500 mm. from the end of the furnace and then rose vertically for 350 mm. An electronic precipitator was used to prevent any nicotinic acid from escaping as dust. A 1.5337 g. quantity of nicotinic acid, in a small porcelain boat, was placed into the sublimer furnace. A slow air bleed, approximately one cubic foot per hour, was permitted to flow past the porcelain boat. The temperature was held at 250° C. for one hour. A total of 1.096 cubic foot of air was required to sublime all but 0.04% of the nicotinic acid.

EXAMPLE V

Using the apparatus and procedure described in Example IV, crude nicotinic acid cake having a nicotinic acid content of approximately 90% was charged to the porcelain boat. A total of 2.076 cubic feet of air at 482° F. was used as an entrainer. The sublimate, weighing 4.8556 g., represented 91.6% of the material charged, or a yield of greater than 99% based upon the nicotinic acid present in the crude feed. The product analyzed 99.7% pure nicotinic acid.

EXAMPLE VI

Nicotinic acid was sublimed using the apparatus and procedure described in Example IV. Nitrogen was substituted for air as the entrainer. Results obtained were comparable to those of Example IV.

EXAMPLE VII

An apparatus was constructed comprising a small batch sublimer, consisting of a heated box into which trays of solid material could be placed, and a condensing tank. An entrainer, comprising 100% steam, was passed over the trays containing the feed material to pick up the nicotinic acid vapors. Nicotinic acid was crystallized by passing the vapors into the water tank. Two runs were made to test the effect of varying the feed composition. The feed for run 1 comprised a mixture of 1 part nicotinic acid and 1% sodium sulfate by weight. The feed of run 2 was a crude nicotinic acid cake consisting of 56.0% nicotinic acid, 31.7% sodium sulfate, and 12.3% water. The data is shown hereunder in Table I.

*Table I*

| Run No | 1 | 2 |
| --- | --- | --- |
| Elapsed time of run, hrs | 4 | 4 |
| Avg. crystal bed temp., ° C | 225 | 225 |
| Avg. steam inlet temp., ° C | 198 | 221 |
| Steam rate, lbs./hr | 20.0 | 18.4 |
| Total steam, lbs | 80.1 | 73.7 |
| Total crude nicotinic acid charged, lbs | 28.0 | 28.0 |
| Total nicotinic acid sublimed, lbs | 7.81 | 6.32 |
| Yield, percent | 56.0 | 40.0 |
| Avg. entrainer ratio, mol nicotinic acid/mol. stm | 0.013 | 0.015 |

A product having a purity substantially equal to that of Example I was obtained. The somewhat low yields were occasioned by the crude nature of the equipment used.

I claim:

1. Method of separating nicotinic acid made by oxidation processes from admixed organic impurities and inorganic salts by sublimation comprising passing an inert gas comprising steam over said nicotinic acid in an amount of 1 pound mol of gas per 0.005–0.02 pound mol of nicotinic acid at a temperature of 160–250° C., to entrain nicotinic acid vapors in said gas, contacting said gas containing said nicotinic acid vapors with water to form an aqueous slurry of nicotinic acid, and recovering substantially pure nicotinic acid from said slurry.

2. Method of separating nicotinic acid made by oxidation processes from admixed organic impurities and inorganic salts by sublimation comprising passing a steam-air mixture over said nicotinic acid in an amount of 1 pound mol of gas per 0.005–0.02 pound mol of nicotinic acid at a temperature of 210–220° C. and a pressure of 3 inches of water to one atmosphere to entrain nicotinic acid vapors in said gas, contacting said gas containing said nicotinic acid vapors with water to form an aqueous slurry of nicotinic acid, filtering said slurry to remove pure nicotinic acid therefrom, and drying said pure nicotinic acid at a temperature below 120° C.

3. Method according to claim 2 wherein the nicotinic acid crystals of said slurry are contacted with 0.5–2% by weight of charcoal, based upon the weight of said crystals, heated to solution, and said solution is filtered to remove said charcoal and cooled to recrystallize the nicotinic acid.

References Cited in the file of this patent

UNITED STATES PATENTS

| | | |
|---|---|---|
| 1,892,396 | Jaeger | Dec. 27, 1932 |
| 1,929,381 | Jaeger | Oct. 3, 1933 |
| 2,295,870 | Seibert et al. | Sept. 15, 1942 |
| 2,586,808 | Frankenburg | Feb. 26, 1952 |
| 2,721,202 | Wirz | Oct. 18, 1955 |